UNITED STATES PATENT OFFICE.

MAX HÖNIG, OF BRÜNN, AUSTRIA-HUNGARY.

MAKING TANNIN EXTRACT.

SPECIFICATION forming part of Letters Patent No. 578,334, dated March 9, 1897.

Application filed September 29, 1896. Serial No. 607,348. (No specimens.) Patented in Austria April 11, 1896, No. 46/1,453.

*To all whom it may concern:*

Be it known that I, MAX HÖNIG, a subject of the Emperor of Austria-Hungary, residing at Brünn, in the Province of Moravia, in the Empire of Austria-Hungary, have invented certain new and useful Improvements in the Process of Manufacture of Tannin Extract from Sulfite Cellulose Lyes, (for which I have obtained Letters Patent in Austria, No. 46/1,453, dated April 11, 1896;) and I do hereby declare the following to be a full, clear, and exact description of the invention, such as will enable others skilled in the art to which it appertains to make and use the same.

The universally-known methods of utilizing sulfite cellulose lyes for tanning purposes or for producing tannin extracts are attended by drawbacks that relate partly to the quality of the tanning fluids obtained by means of these methods and partly to the methods themselves. Thus when the lyes produced by treating wood with calcium bisulfite for the purpose of obtaining tannin extracts direct—that is to say, without previous neutralization—are treated with sulfuric acid and the liquid thereby deprived of lime is then used directly or after being concentrated for tanning skins the tanning process is effected under the influence (in many respects injurious) of the sulfuric, acetic, and other free acids that are still present in the tanning liquor with the tannin. On the other hand, the method according to which the tannin is precipitated from the sulfite cellulose lyes first in the form of a lime salt, and the latter is then decomposed by means of acids, can be exclusively employed only for those lyes which result from the treatment of oak wood with calcium bisulfite, because of all the kinds of wood which enter into consideration for the production of cellulose the oak is the only one whose tannic acid is capable of being precipitated by means of lime, while for the lyes produced from those kinds of wood (such as beech, fir, and pine) that are mainly and generally employed for the production of cellulose this method cannot be employed at all.

Now the present invention relates to a process for producing tannin extract from sulfite cellulose lyes which obviates the above-mentioned drawbacks of the processes hitherto known. According thereto the sulfite lyes are first neutralized with the greatest possible accuracy by means of carbonate of lime or caustic lime, then concentrated to a medium degree of concentration, then mixed with a quantity (corresponding to that of their contained lime) of sulfuric acid or other acid that will produce an insoluble or difficultly-soluble lime salt, and finally, after being filtered from the precipitated sulfate of lime or other salt, brought by a second concentration to the desired final density.

The process specified above may be carried out as follows: The sulfite lyes that constitute the raw material for the manufacture of tannin extract are first carefully neutralized with carbonate of lime or caustic lime, because according to the above-described procedure the next following concentration of the liquor to a medium density (between 15° and 18° Baumé) can only be properly effected after the free acids present therein have been neutralized as accurately as possible. The lyes thus neutralized and clarified by deposition are then concentrated in the usual manner to between 15° and 18° Baumé and are then mixed in lead-lined boilers with a quantity of dilute sulfuric acid or other acid that will form an insoluble or difficultly-soluble lime salt, the quantity of acid added being suited to the amount of lime contained in the lye. The whole is then heated by admission of steam until all the volatile acids are expelled. The precipitated sulfate of lime is filtered off, and the filtrate is brought in a vacuum apparatus to the desired final density, (between 28° and 30° Baumé.) After complete clarification effected by deposition this filtrate can now be used as a tannin extract of between 28° and 30° Baumé.

The process herein described is thus distinguished by the following special features: first, the careful and most accurate neutralization of the sulfite lyes with carbonate of lime or caustic lime; second, the evaporation or concentration of the neutral lyes in two separate stages; third, the treatment of the neutral lyes at their first degree of concentration (between 15° and 18° Baumé) with sulfuric acid or other acid which produces insoluble lime compounds for the purpose of separating or precipitating the lime and liberating the volatile acids; fourth, the steaming of the lyes after treatment with acids, whereby the liberated volatile acids are expelled, and, fifth, the concentration of the lyes when freed from lime and volatile acids to the second degree of concentration, (between 28° and 30° Baumé.)

I claim—

1. In a process for the extraction of tannin from sulfite cellulose lyes, neutralizing the same with a suitable calcium salt, clarifying, and concentrating the neutral clarified lye, converting the lime therein into a substantially insoluble compound by means of an acid, eliminating from the lye the free volatile acids by means of heat, filtering, and then concentrating the filtrate to a suitable degree, for the purpose set forth.

2. In a process for the extraction of tannin from sulfite cellulose lyes, neutralizing the same with lime, clarifying, and concentrating to from about 15° to 16° Baumé, converting the lime into an insoluble compound by means of sulfuric acid, eliminating from the lye the free volatile acids by heat, filtering, and concentrating the filtrate to from about 28° to 30° Baumé, substantially as set forth.

In testimony whereof I affix my signature in presence of two witnesses.

MAX HÖNIG.

Witnesses:
HARRY BELMONT,
JOSEF MERKE.